Figure 1:
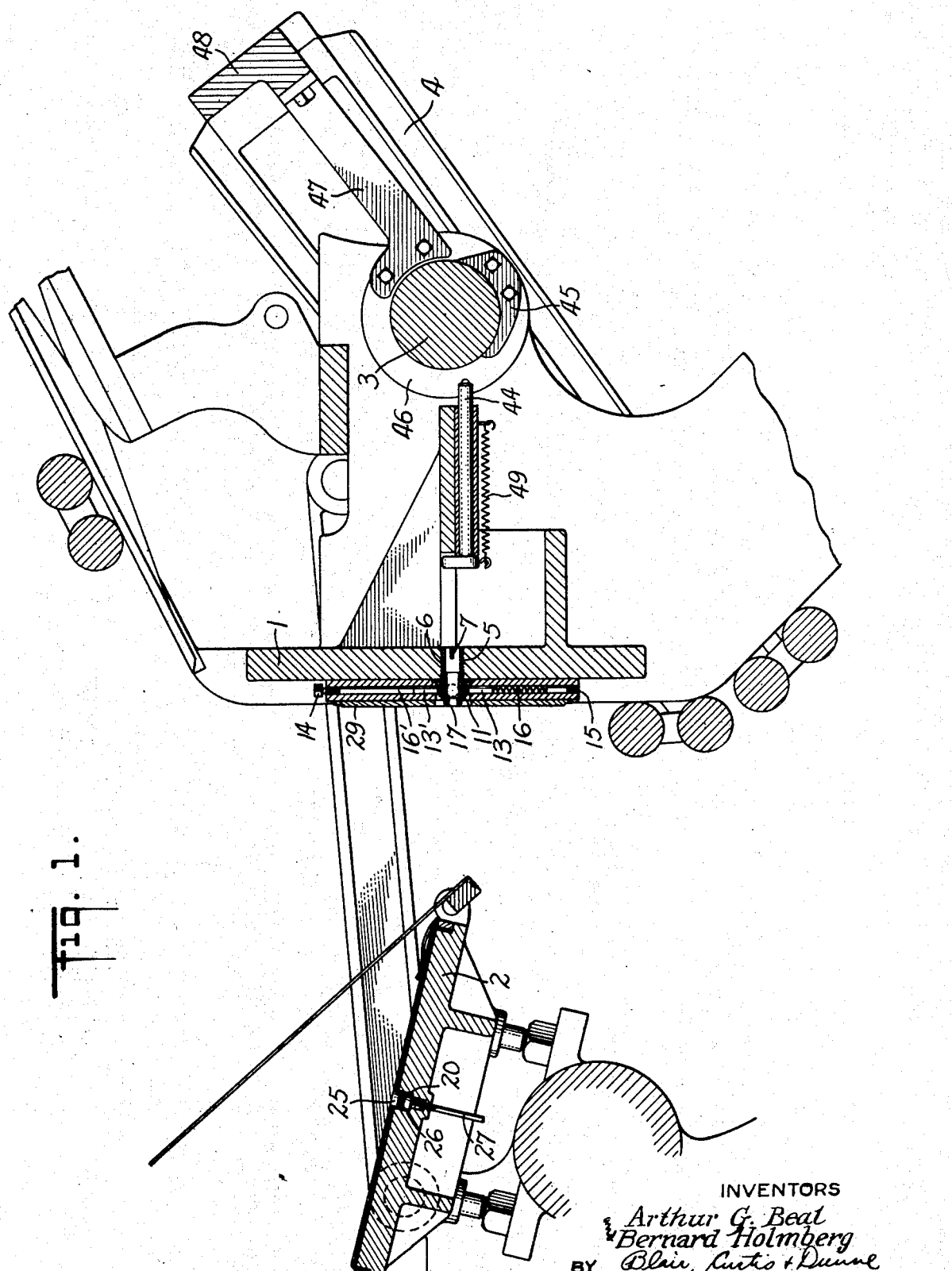

Jan. 4, 1938.  A. G. BEAL ET AL  2,104,551
METHOD OF AND APPARATUS FOR PRINTING INSTRUMENT CHARTS OR THE LIKE
Filed Feb. 7, 1936  3 Sheets-Sheet 3
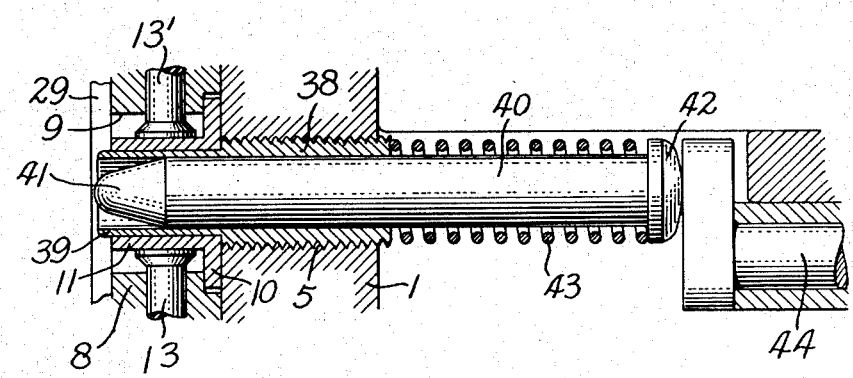
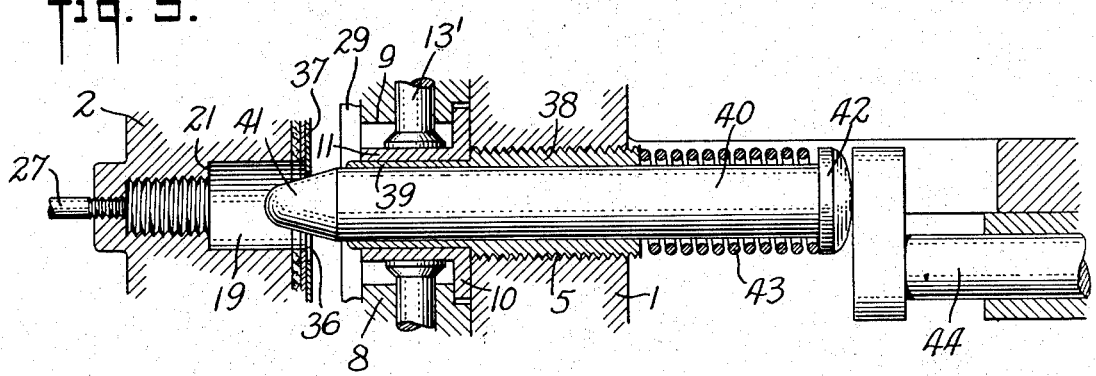
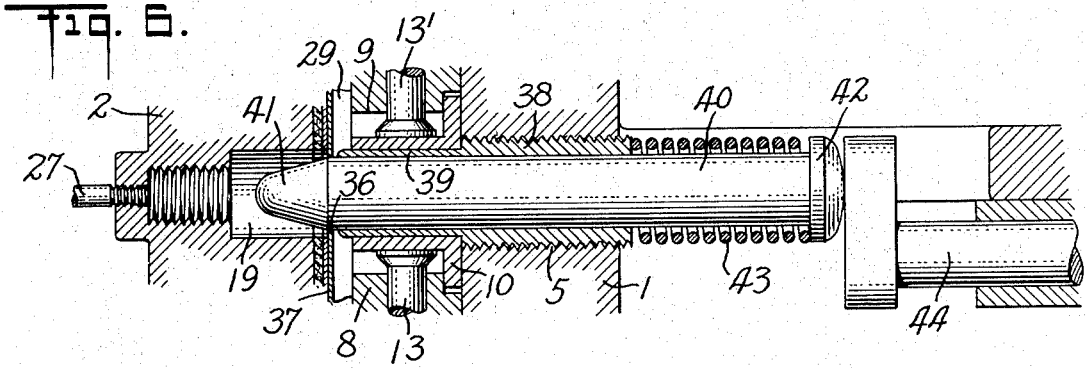
INVENTORS
Arthur G. Beal
Bernard Holmberg
BY Blair, Curtis & Dunne
ATTORNEYS Patented Jan. 4, 1938

2,104,551

UNITED STATES PATENT OFFICE 2,104,551

METHOD OF AND APPARATUS FOR PRINTING INSTRUMENT CHARTS OR THE LIKE

Arthur G. Beal and Bernard Holmberg, Foxboro, Mass., assignors to The Foxboro Company, Foxboro, Mass., a corporation of Massachusetts Application February 7, 1936, Serial No. 62,846

5 Claims. (Cl. 101—296)

The present invention relates to an improvement in methods of and apparatus for printing instrument charts or the like. One object thereof has been to provide a method and apparatus whereby recording instrument charts or the like having chart markings on both sides accurately concentric with each other can be produced with greater precision and more rapidly and economically than has heretofore been possible.

Charts of the general type here considered are commonly employed for continuously recording values of pressure, temperature, and other variable factors reacting on suitable measuring instruments wherein the passage of time is related to angular movement of a dial or the like and variations in the variable quantities measured are represented by radial movement of a marker or index toward and from the axis of a central hub or of the dial. Obviously, the accuracy of the readings of value so recorded on charts having concentric circular fiducial markings is dependent in large measure upon the concentricity of said markings with the central hub of the instrument. Great care is therefore used in printing to make all the circular fiducial markings of the chart accurately concentric with the center hole thereof and thus, when the chart is in place, with the central hub of the measuring and recording instrument which is calibrated in relation to the hub. The relatively rapid production of single face charts or those having the fiducial markings on one side only now presents no serious problems; but attempts to produce double face charts have encountered difficulties both in obtaining the required accuracy in concentricity of the circular markings with the center hole and in keeping the cost thereof within acceptable commercial limits.

In methods wherein the chart blank, having one face printed, is positioned on the platen of a printing press by registering or guiding devices engaging two or more of its edges, imperfections, such as non-concentricity of the two printings, result where there is any irregularity in the shape or size of the blanks or sheets either from inaccuracy in cutting or from humidity conditions different from those existing at the time the first side or face was printed and the center hole punched. In these or other methods where individual hand positioning of each blank is used to obtain the necessary accurate placing of the second impression, the rate of production is slow and the cost is excessive.

To obviate the foregoing and other disadvantages of known methods, the present invention utilizes a sheet guiding or positioning principle which insures the desired accurate concentricity and permits rapid production of the double face charts on suitable high speed presses. Broadly stated, our novel method comprises the steps of printing the desired chart lines or markings on one side of a chart blank or sheet concentric with the center hole thereof and then printing the other side while holding the sheet in printing position by means of said center hole.

Our invention further includes novel apparatus for carrying out the steps of said improved method, one embodiment thereof being illustrated in the drawings accompanying this specification and wherein—

Figure 2:
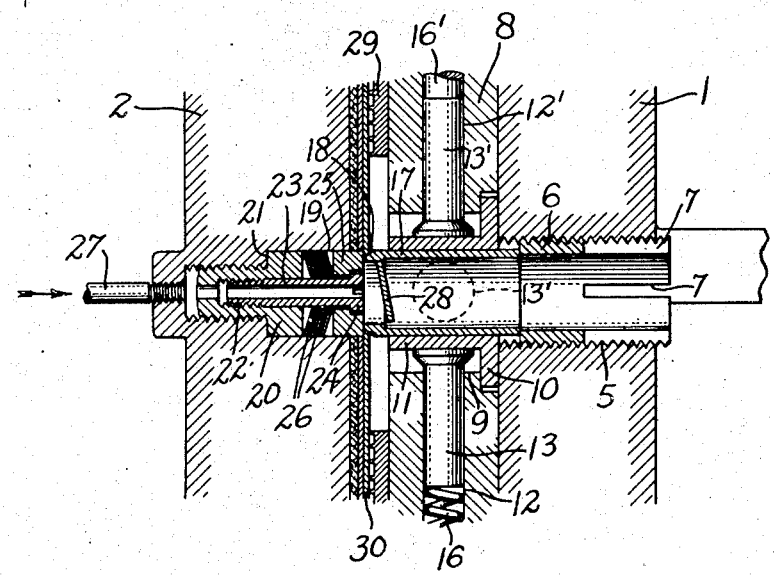
Figure 3:
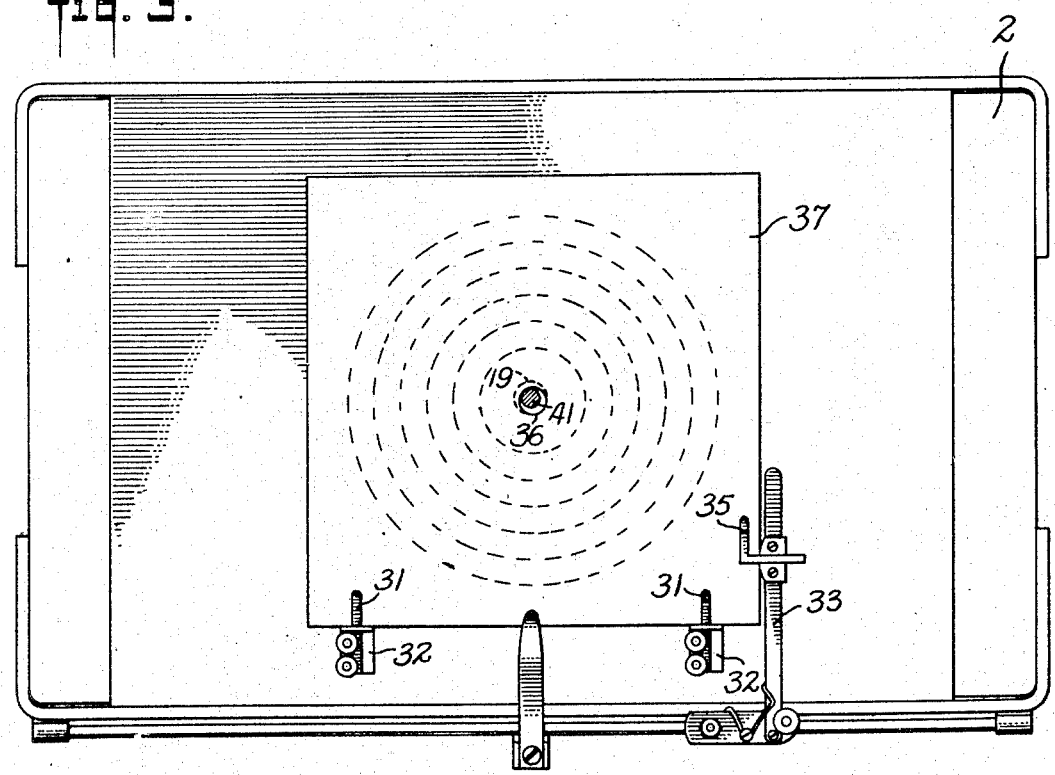

Figure 1 is a substantially central vertical section of a portion of a well known form of printing press with the improved center hole punching and blank positioning devices applied thereto and set for the initial printing and punching operation;

Figure 2, a fragmentary view in section of a portion of the bed of the press shown in Figure 1;

Figure 3, a plan view of the platen of said press with a chart sheet printed on its under side and preliminarily or approximately positioned on the platen to receive printing on its exposed or upper side;

Figure 4, a fragmentary view in section of a portion of the bed showing the chart positioning pin or plunger in retracted position, i. e. below the path of the inking rollers;

Figure 5, a fragmentary view in section of a portion of the bed and a similar view of a portion of the platen showing the latter moving toward printing position in relation to the bed; and Figure 6, a fragmentary view in section of a portion of the bed and a portion of the platen with the parts occupying the relative positions effective at the instant of printing that side or face of the chart shown as exposed in Figure 3.

Referring to the drawings, our improved chart cutting and positioning devices are shown as applied to portions of one of the well known Kluge presses. Pertinent parts thereof include the bed I and the platen 2, the back shaft 3 and the inking roller carrying arm 4 pivotally mounted on back shaft 3.

As better seen in Figure 2, the bed I is provided with a recess or opening 5 threaded to receive a bushing 6 having longitudinal slots 7 opening through its rear edge. A base or bed plate 8 for supporting the cut from which the chart markings are printed is releasably secured on the outer face of bed 1 by any suitable means, such as bolts or the like, not shown, and has an opening or bore 9 enlarged at its inner end to receive the flange 10 of a cylindrical hollow sleeve 11 and to allow for transverse adjustment of said sleeve in bore 9 to make said sleeve concentric with chart markings on the cut. For this adjustment operation the bed plate 8 is also provided with two sets of opposed radial drill holes 12 and 12' spaced 90° apart and each extending from an outer edge of the plate to said bore 9. Each hole 12 is provided with a plunger 13 having an enlarged inner end forming a head which bears yieldingly against a peripheral portion of sleeve 11 and each hole 12' with a similar plunger 13' of which the head bears rigidly against sleeve 11 in opposition to said yielding heads. A bolt 14, Figure 1, is threaded in the the outer end of each hole 12 and a plug 15 is secured in the outer end of each hole 12'. A spring 16 is interposed between and engages the opposed ends of the plunger 13 and the corresponding plug 15 respectively in each hole 12; and a rigid plunger 16' is similarly arranged between bolt 14 and plunger 13' in each hole 12'.

By the means just described, sleeve 11 is supported in its position in bore 9 by the two plungers 13 and the two plungers 13' and is capable of transverse adjustment therein to obtain concentricity with the chart markings of the cut to be printed from, by appropriate manipulation of the bolts or set screws 14 in co-operation with said springs 16; this arrangement being effective in obtaining extremely fine and accurately controlled adjustments. The above described mechanism for supporting and adjusting sleeve 11 embodies details of construction more particularly described and claimed in a co-pending application of B. C. Rost, Serial No. 119,758, filed January 9, 1937.

A hollow cylindrical cutter or die 17 having a lapped flat cutting surface or edge 18 at its outer end is fitted snugly into the bore of the sleeve 11 and with its rear edge bearing upon the inner end of threaded bushing 6. By unscrewing or backing out said bushing 6 the cutter can be repositioned longitudinally in the sleeve 11 to present the cutting edge at different distances beyond the outer edge of the bushing to accommodate printing plates of different thicknesses of material to be punched or cut or to compensate for reduction in the length of the cutter due to regrinding of the cutting end thereof. The slots 7 provide holds for a suitable collapsible inside operating wrench; and where the wall portions at the end of the bushing between the slots 7 are slightly flared, they bear yieldingly against adjacent portions of the hole 5 and, to that extent, tend to prevent loosening or creeping of the bushing caused by vibration, or the like.

As shown more clearly also in Figure 2, the platen 2 has a central recess or opening 19 adapted to receive a screw plug 20 with its head flange seated against an inner annular shoulder 21. Plug 20 is made with a central passageway of which a portion, as at 22, is threaded to hold a hollow stem 23 having a head 24 at its outer end. A counter or block 25 having a hardened lapped outer or cutter blocking surface is retained in operative position in the recess 19 by the flanged head 24 and is yieldingly pressed outwardly against the under edge of said head by suitable means, as spring spacers or cup washers 26 which are shaped to permit a slight rocking or tilting movement of block 25 when engaged by cutter 17 in the punching operation to bring the whole flat cutting edge thereof into effective cutting relation to the flat outer surface of said block.

A pipe 27, connected to a source of air under pressure, not shown, is arranged to discharge into the passageway formed by plug 20 and stem 23, at predetermined intervals as by periodic operation of a control valve, not shown, or so as to blow out or eject cutout portions, as 28, of the blanks through the passageway formed by annular cutter 17 and annular bushing 6 and thence through suitable conduit means to a receptacle, not shown.

In operation of the apparatus thus far described, the printing plate, cut, or electrotype 29 of the matter, as chart markings, to be printed is suitably secured to bed plate 8 by known means and is adjusted as closely as practical to make the concentric circular printing ridges on the cut approximately concentric with the sleeve 11. Final adjustment is made by adjusting bolts 14. The sheets or blanks, as 30, of paper, or other suitable material, are then placed one at a time on the platen 2 by well known feeding devices and retained in position by clips 31, Figure 1, and 35, Figure 3, cooperating with suitable guides or stops 32 and 33. With a press of the kind shown in the drawings, the blanks are automatically fed in succession from a stack to the platen which swings from retracted position toward the bed and back again in a well known manner. During each complete reciprocation of the platen, the chart design is printed on one face or side of a sheet or blank and the center hole or perforation is punched therein, after which, the printed and perforated sheet is automatically removed from the platen and stacked with other like sheets. As soon as the ink is dry or any time thereafter these sheets may be printed on their other sides.

To prepare the press for printing the sheets on their other sides, i. e. to complete the double-face charts above described, the stops or guides 32, Figure 3, are backed off a little, $\frac{1}{32}$ of an inch or thereabouts, and a similar change is made in the position of the side guide 33, so that when the printed and center holed sheet 37 is placed on the platen, as in Figure 3, it will be slightly off center in a downward direction with reference to the opening 19 therein. This avoids buckling at a later stage in case the center hole, as 36, has not been located precisely at the center of the sheet, or if the sheet is slightly irregular in shape. It will also be understood that the clips 31 and 35 are adjusted in relation to sheet 37 to permit sliding movement of the blank in relation to the platen surface and so to avoid tearing the blank at the edges of center hole 36 in the centering operation hereinafter described.

It will be apparent that, in the case of blanks or sheets of circular shape, the setting or arrangement of guides 32 and 33 will be different from that shown in Figure 3.

Further preparation for the second printing includes removing the block 25, stem 23, plug 20, and washers 26 from the recess or opening 19 in the platen 2, which now appears as shown in Figures 5 and 6. Likewise, the cutter 17 is removed from sleeve 11, and the bushing 6 is taken out of the bed opening 5 and replaced by another bushing 38 having a reduced forward end portion 39 fitting snugly in the sleeve 11, Figure 4. A plunger 40 having a tapered forward end 41 and a flanged rear end 42 is mounted to slide in the bore of bushing 38, being held in retracted position, Figure 4, by a spring 43.

Forward movement of plunger 40 is produced by a push rod 44 mounted in the rear of bed 1 and having its rear end projecting in the path of a cam 45, Figure 1, mounted on a bracket which includes a ring 46 loosely embracing and concentric with back shaft 3 and supported by an arm 47 secured to the cross piece 48 of the inking roller carrying arm 4. It will be apparent that, as arm 4 rocks around its axis, which is also the axis of back shaft 3, cam 45 will have a limited angular movement and when properly positioned on ring 46 will engage and impart forward endwise movement to plunger 44 against the yielding resistance of a spring 49. In Figure 5, plunger 44 is shown in partly advanced position, and in complete advanced position in Figure 6.

The advancing movement of plunger 44 and consequently of the sheet positioning pin or plunger 40 illustrated in Figures 4, 5 and 6, is timed with the reciprocating movement of platen 2 so that, as the latter closely approaches bed 1, as in Figure 5, the tapered end 41 of plunger 40 enters and engages inner edge portions of center hole 36 of sheet 37. With continued movement of platen 2 toward bed 1 and of plunger 40 toward the platen, said inner edge portions of hole 36 ride up on the tapered end 41 to the final position as shown in Figure 6, with the shank or main portion of plunger 40 occupying the center hole 36, thus lifting the sheet from its initial nonconcentric position to its concentric printing position. The second face of sheet 37 is now brought into printing contact with the printing plate, cut, or electrotype 29, and the circular markings of the second printed impression are concentric with those of the first printed impression on the opposite side of the sheet because both are accurately concentric with the center hole 36. The cycle of automatically feeding the blanks to the platen and removing them therefrom after they have been printed is now repeated, and the rate of output of charts with the fiducial markings printed on both sides is limited only by the capacity of the particular machine employed in the work. Over 3000 imprints per hour can be made as above described on the Kluge press altered for the purposes of this invention to include the constructions shown in the appended drawings, although it is contemplated that the steps of the improved method may be performed in connection with the operation of widely varying types of machines or apparatus, or partly by hand and partly by machine operations.

The above described operation may be carried out on charts which have been printed on one side and cut to the round contour generally required for the instruments on which the charts are used. When printing such cut charts it is only necessary to use two guides 31 to position the hole of the chart 36 slightly below concentricity with the plunger 41 so that operation of the plunger 41 always lifts the chart from its resting position.

Where the above described apparatus or its equivalent is employed, advantageous results are obtained by exercising special care in establishing concentricity between the electrotype and the cutter or cutter holding sleeve before printing the first side of the chart. In practice, the accuracy of the assembly of the bed plate 12, the sleeve 11 and the electrotype 29 can be effectively tested by placing the bed plate 12 on a turn table and carefully observing variations of the plate markings or of the sleeve end from concentricity with the hub of the turn table by reference to a fixed fiducial point when the table and the bed plate are rotated past said point, the accuracy of these observations being facilitated by employing a magnifying glass.

The tested bed plate assembly is now secured to the bed 1, and a trial or test printing and punching is made on a chart blank which is then tested on the turn table with the aid of the magnifying glass. If the center hole and the chart markings are found to be accurately positioned, i. e. concentric, the required number of blanks or sheets can now be center holed and given the first printing by automatic operation of the cutting and printing devices first above described, or their equivalent. If it is found that the center hole and the chart markings are not exactly concentric within the limits of the accuracy of the electrotype, they may be brought into concentricity by adjusting the bolts 14.

Certain of the machine parts are now interchanged as above described. A trial printing is made on the unprinted side of one of the previously perforated and printed sheets by the altered apparatus, and the second imprint is preferably tested for concentricity on the turn table, or by other suitable expedient. If the hole and chart markings are not found to be concentric they may be brought into concentricity by loosening the base plate 8 on the bed plate 1 to permit relative movement therebetween produced by means of adjusting the bolts 14. After the estimated correct adjustment has been made, the base 8 is again tightened on the bed plate 1 and another trial printing made. This process is repeated until the desired accuracy is secured.

As shown in Figure 3, on the second run, the guides or stops on the platen or tympan are not relied upon to determine the effective printing position of the sheet. It is sufficient if the center hole 36 of the sheet only approximately registers with the platen opening when the perforated sheet is first fed to the platen. However, as shown in Figures 5 and 6 and previously described, the sheet is lifted from its approximate or tentative initial position by operation of the plunger 40 engaging an edge portion of center hole 36 of the sheet 37 to bring its second face into position to receive an imprint thereon which will be accurately concentric with like markings previously printed on the first printed face or side, assuming of course that the cut or printing plate is properly mounted on its base.

It will be apparent from the foregoing description of our invention and of its mode of operation, that the improved method and apparatus obviate the difficulties first referred to in producing a double face instrument chart; and that the method also insures accuracy and can be employed in connection with machines capable of rapid and reliable production.

We claim:

1. Method of printing a recording instrument chart or the like having a central hole therein and circular chart markings in concentric relation to said hole on both sides of said chart, which includes the steps of printing chart markings concentric with said hole on one side of a chart blank, moving said blank toward printing position with its opposite side exposed to receive concentric chart markings, said blank being then positioned to bring said chart markings to be printed on said opposite side only approximately concentric with said hole, and applying a blank adjusting device to edge portions of said hole to move said blank into the position where said opposite side thereof will receive said chart markings concentric with said hole.

2. Method of printing a recording instrument chart or the like having a central hole therein and circular chart markings in concentric relation to said hole on both sides of said chart, which includes the steps of printing chart markings concentric with said hole on one side of a chart blank, moving said blank toward printing position with its opposite side exposed to receive concentric chart markings, said blank being then positioned to bring said chart markings to be printed on said opposite side only approximately concentric with said hole, applying a blank adjusting device to edge portions of said hole to move said blank into the position where said opposite side thereof will receive said circular chart markings concentric with said hole, and printing said markings on said opposite side of the blank while maintaining centering engagement of said blank adjusting device with said central hole.

3. Method of printing a recording instrument chart or the like having a central hole therein and circular chart markings in concentric relation to said hole on both sides of said chart, which comprises the steps of printing said chart markings on one side of a chart blank concentric with the central hole thereof and then printing the chart markings on the other side of said blank concentric with said central hole and with said first printed chart markings while maintaining the chart blank in printing position entirely by reference to said central hole in the blank.

4. A press for printing instrument charts or the like having a central hole and circular markings on both sides concentric with said hole, comprising in combination a bedplate having an opening and means for securing a printing instrumentality thereon, a platen having an opening located in substantially coaxial relation with the bedplate opening when the platen is in printing relation to the bedplate, means on the platen for supporting a chart blank thereon with the central hole of the blank approximately co-axial with the platen opening, a plunger mounted for endwise reciprocating movement in said bedplate opening and co-axially therewith, means for moving the platen toward the bedplate, and means for advancing said plunger through said bedplate opening into engagement with inner edge portions of said center hole in the blank to adjust and retain said blank in position to receive chart markings concentric with the center hole of the chart.

5. Apparatus for printing recording instrument charts having a central hole and circular chart markings on both sides concentric with said hole, comprising in combination a base member for supporting a printing plate and having an opening therethrough, a printing plate having a central opening and mounted on said base with its opening co-axial with the opening in the base, a plunger mounted for endwise movement through said openings in the base and printing plate respectively, supporting means for a chart blank including a platen movable toward and away from said base and having an opening positioned to come co-axially opposite the opening in said printing plate during printing and to receive said plunger when in extended position, means for initially retaining the chart blank in position on the platen with its central hole only approximately concentric with the platen opening, and means for effecting relative movement between the plunger and edge portions of said hole in the chart blank to move said blank into position to receive chart markings concentric with its central hole.

ARTHUR G. BEAL.
BERNARD HOLMBERG.